United States Patent Office 3,261,825
Patented July 19, 1966

3,261,825
AZO-DISULFIDE TRIAZINE DYESTUFFS
Thomas E. Lesslie, Mount Holly, and Gordon A. Geselbracht, Charlotte, N.C., assignors to Martin-Marietta Corporation, a corporation of Maryland
No Drawing. Filed Mar. 11, 1963, Ser. No. 264,046
14 Claims. (Cl. 260—153)

The present invention relates to dyestuffs, and more particularly to improved a o-disulfide dyestuffs and to the method for making same.

The azo-disulfide dyestuffs of the present invention are particularly characterized in that they have the formula

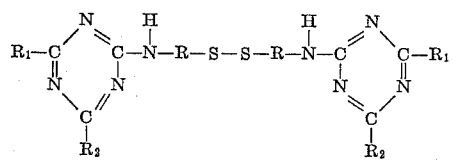

wherein R is a substituted or unsubstituted aryl substituent, $R_1$ is a substituent selected from the group consisting of halogen, amine, and substituted amine, and $R_2$ is a chromophoric group. For example, the compounds of the present invention may have the formula

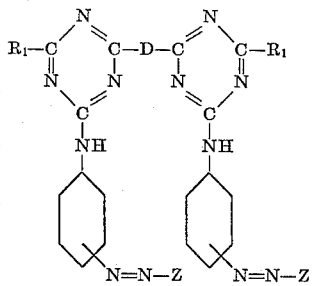

wherein D is the radical of a member selected from the group consisting of diaminodiphenyldisulfides and diaminodinaphtyldisulfides, D being linked to the triazines via its amino groups; $R_1$ is a member selected from the group consisting of chlorine and phenylamino; Z is the radical of a member selected from the group consisting of acetoacet-ortho-anisidide, 3-methyl-5-pyrazolone, 1-phenyl-3-methyl-5-pyrazolone, 2,4-dihydroxyquinoline, β-naphthol, and 3-hydroxy-2-naphth-ortho-anisidide; and in which the azo groups are positioned meta or para with respect to the amino groups attached to the phenyl rings.

Generally speaking, the novel azo-disulfide dyestuffs of the present invention are synthesized by condensing one molecular proportion of a chromophore with one molecular proportion of a cyanuric trihalide, and condensing one molecular proportion of the resulting product with one-half molecular proportion of a diamino disulfide having the formula $H_2N$—R—S—S—R—$NH_2$, wherein R is a substituted or unsubstituted aryl substituent, to produce the dyestuff. Optionally, the dyestuff may be further reacted by condensing one molecular proportion thereof with two molecular proportions of an amine or substituted amine, e.g. by replacing the final halogen of each cyanuric nucleus.

One of the objects of the present invention is to produce azo-disulfide dyestuffs that have good wash fastness when applied to cotton or regenerated cellulose.

Another object of the present invention is to produce azo-disulfide dyestuffs that provide very high color yield when applied by the reduction-oxidation dyeing method.

Another object of the present invention is to produce azo-disulfide dyestuffs that have good light fastness.

Another object of the present invention is to produce azo-disulfide dyes that show little if any, change of shade or light fastness when fabrics dyed therewith are after-treated with resin.

Another object of the present invention is to produce a valuable new group of azo-disulfide dyestuffs having therein members covering a wide color range.

Certain azo-disulfide dyestuffs have been known for a number of years, but the azo-disulfide dyestuffs have been never gone into commercial production.

The azo-disulfide dyestuffs of the prior art are all subject to disadvantages and limitations, among which are the following.

Textile fibers may be dyed with azo-disulfide dyestuffs by a reduction-oxidation method comprising the steps of applying a dye composition comprising azo-disulfide dyestuff and reducing agent to the fibers, steaming the fibers, optionally washing the fibers, and oxidizing the dyestuff, preferably with an acid-oxidizing agent, which method is claimed in U.S. patent application Serial No. 264,413, filed on even date herewith. Although the washing step is preferred, to prevent dilution of the oxidizing bath with excess reducing agent and to avoid formation of hydrogen sulfide gas when the oxidizing bath is acid, many of the known azo-disulfide dyestuffs are removed in substantial quantity from the fibers by washing prior to oxidizing.

Some of the known azo-disulfide dyestuffs have poor light fastness properties.

The above disadvantages and limitations have been overcome by the azo-disulfide dyestuffs of the present invention, as follows.

It has been found that the azo-disulfide dyestuffs of the present invention may be used to dye cotton and regenerated cellulose textile fibers by the reduction-oxidation method and may be washed following reduction and prior to oxidation without noticeable removal of dye; that the resulting dyeings have good wash fastness and light fastness, and may be after-treated with resin without changing the shade or light fastness property of the dyeing. Moreover, a wide range of colors may be obtained by using different chromophores in synthesizing the dyestuffs.

The substituted or unsubstituted aryl substituent of the dyestuff, represented by R, will usually be phenyl, substituted phenyl, naphthyl, or substituted naphthyl, and preferably phenyl for reasons of economy; and selection of the aryl or substituted aryl substituent has no apparent effect on the azo-disulfide dyestuff or its dyeing properties.

The $R_1$ substituent will be selected from the group consisting of halogen, amine, and substituted amine. For reasons of economy, the $R_1$ substituent will preferably be Cl, as selection of a halogen for the $R_1$ substituent omits the necessity for an additional condensation reaction to replace the halogen, and cyanuric trichloride is a more economical starting material than the other cyanuric trihalides. The $R_1$ substituent may be varied widely without changing the properties of the dyestuff.

The $R_2$ substituent of the dyestuff is a chromophoric group, and its selection determines the color of the dyestuff. The chromophoric group of the dyestuff may be attached to the cyanuric trihalide through an NH, S, or O linkage, and therefore the chromophore which is selected for condensation with the cyanuric trihalide should contain a condensable group, such as a free amino group, a free thiophenol group, or a free hydroxy group.

Chromophores are well understood in the dye synthesis art. Witt, in 1876, pointed out that all colored organic molecules contain one or more doubly bonded groups such as —N=N—, >C=C<, >C=N—, >C=O, and —N=O which he called "chromophores." As stated by Dr. Lubs, "In more recent usage, the term (chromophore) is often applied to a complete conjugated unit, a group of atoms bearing a continuous chain or network of interacting mobile electrons which may be excited by a single photon," and this more modern usage is the definition herein intended.

The novel azo-disulfide dyestuffs of the present invention are synthesized by a series of condensation reactions, whereby one molecular proportion of a condensable chromophore is condensed with one molecular proportion of a cyanuric trihalide (trihalogeno triazine) to form a dihalogeno-triazine-chromophoric intermediate; and one molecular proportion of the dihalogeno-triazine-chromophoric intermediate is condensed with one-half molecular proportion of a diamino disulfide having the formula $H_2N-R-S-S-R-NH_2$, wherein R is an aryl or substituted aryl group, to form an azo-disulfide dyestuff having two mono-halogeno-triazine-chromophoric groups coupled to the diamino disulfide through imino linkages; and optionally conducting a third condensation reaction to displace the remaining halogens with amines or substituted amines, as by condensing one molecular proportion of the halogen containing azo-disulfide dye with two molecular proportions of an amino, aromatic amino or aliphatic amino or compound.

The chromophores may be prepared in any convenient manner, such as by diazotising a nitroarylamine, coupling one mole of the diazotized nitroarylamine to one mole of 3-methyl-5-pyrazolone, reducing the resulting product with sodium sulfhydrate, filtering and drying.

In condensing the chromophore with the trihalogeno triazine, one mole of each is dissolved in organic solvent and alkali is added to reduce the acidity. The condensation is conducted at about 0°–5° C. The resulting dihalogeno-triazine-chromophoric intermediate has the formula

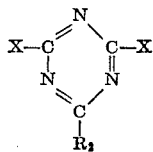

wherein X is a halogen and $R_2$ is a chromophoric group.

In condensing the above dihalogeno-triazine-chromophoric intermediate with the diamino disulfide, one mole of the dihalogeno-triazine-chromophoric intermediate and one-half mole of the diamino disulfide are dissolved in organic solvent, alkali is added to reduce the acidity, and the condensation reaction is conducted at about 15°–20° C. The resulting azo-disulfide dyestuff has the formula

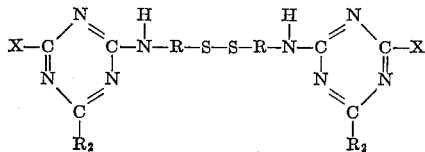

wherein X is a halogen, R is an aryl or substituted aryl substituent, and $R_2$ is a chromophoric group. This azo-disulfide dyestuff may be recovered, as by distilling off the organic solvent, adding water to the dye residue, filtering, washing the dye with warm water until the run-off is clear, and drying the dyestuff.

The third, and entirely optional, condensation reaction may be conducted without isolating the above azo-disulfide dyestuff, and comprises condensing one mole of the above azo-disulfide dyestuff, which contains two mono-halogeno triazine rings, with two moles of an amino, aromatic amino or aliphatic amino compound to split out the last remaining from each triazine ring and connect the amino type compounds to the triazine rings by means of nitrogen atom linkage. This final condensation reaction is conducted at 30°–60° C., with the reactants in organic solvent, and with alkali added to the solution to reduce the acidity. The resulting azo-disulfide dyestuff may be recovered as described above.

Organic solvents such as acetone and dioxane, and alkalis such as sodium carbonate and sodium hydroxide are suitable for use in the above condensation reactions, and the condensation reactions are conducted at pH of about 5.0–6.5.

Several illustrative and non-limiting examples of making the dyestuffs according to the present invention follow.

*Example I*

The chromophore is prepared by diazotising one mole of para-nitroaniline and coupling it to one mole of acetoacetortho-anisidide. This may be done by adding 138.06 gms. paranitroaniline to one liter of water at 20° C., and adding thereto 250 gms. of concentrated hydrochloric acid at room temperature with stirring until dissolved. The resulting solution is cooled to 0° C. and held at that temperature while a slight excess of $NaNO_2$, as shown on KI paper, is added thereto with stirring, about 70 gms. of $NaNO_2$ will be thus added. In a separate container, add 207 gms. of 100% acetoacet-ortho-anisidide to one liter of water at 50° C., and dissolve therein 80 gms. of a 50% aqueous solution of NaOH at room temperature to form a solution of the sodium salt of acetoacet-ortho-anisidide. Cool the solution to 5° C. and add thereto 200 gms. of sodium acetate buffer, and thereafter add to the buffered solution enough 10% aqueous solution of acetic acid at room temperature to give the solution a pH of 6.5–6.8. While maintaining the solution at 0° C., add slowly thereto with stirring, over a period of 15 minutes, the above prepared solution of diazotized para-nitroaniline and stir the combined solutions at 0° C. until coupling is completed, i.e. for about 60 additional minutes. The coupled product is filtered and washed free of inorganics, and the press cake is reduced with 100 gms. of sodium sulfhydrate, filtered, washed with warm water and dried. The chromophore, 4-aminoazoaminophenylazo-acetoacet-ortho-anisidide, results as a dry powder.

The chromophore is condensed with a cyanuric trihalide as follows. In a separate container, one mole of 2,4,6-trichloro-1,3,5-triazine (184 gms.) is dissolved in 1,000 gms. of acetone at 25° C., and the solution is cooled externally to 5° C. Gradually, during a period of 2–3 hours, one mole (326 gms.) of the 4-aminoazoaminophenylazo-acetoacet-ortho-anisidide powder is added to the acetone solution of cyanuric chloride, while the solution is held at 5° C. Following additon of the 4-aminoazoaminophenylazo-acetoacet-ortho-anisidide, the solution is held for an additonal hour at 5° C., whereafter 265 gms. of a 20% aqueous solution of soda ash is gradually added to the solution during a period of 30 minutes, while the solution is maintained at 5° C. by external cooling. The solution is stirred at 5° C. until condensation is completed, i.e. about 30 additional minutes. The solution is tested for free amine by diazotising a sample and coupling with beta-naphthol, and the absence of free amine indicates that coupling of the 4-aminoazoaminophenylazo-acetoacet-ortho-anisidide to the cyanuric chloride is complete, a dihalogeno-triazine-chromophoric intermediate having been formed.

The dihalogeno-triazine-chromophoric intermediate is then condensed with a diamino disulfide as follows. Add one-half mole (124 gms.) of 4:4′-diaminodiphenyldisulfide, which has been dissolved in 300 gms. of acetone, to the above solution, allowing the temperautre to increase to 20° C. Next, add 265 gms. of a 20% aqueous solution of soda ash gradually, during a period of 30 minutes. The solution should now be slightly acid (show neutral on congo paper). Warm the solution to 60° C., distill off the acetone, replace with an equal volume of water, filter to collect the light yellow precipitate, wash the precipitate with warm water until the run-off is clear, and dry the yellow precipitate at about 80° C.

The light yellow precipitate dyes cotton and regenerated cellulose bright greenish yellow shades and is an azo-disulfide dyestuff having the following chemical formula:

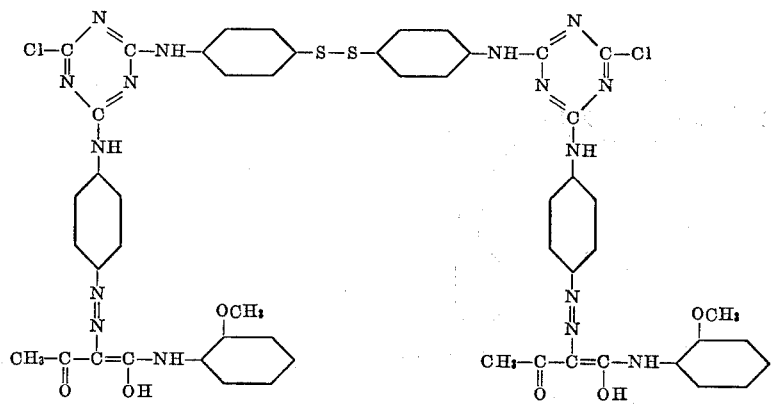

Example II

This example is the same as Example I above, except that one mole (138 gms.) of meta-nitroaniline is substituted for the para-nitroaniline.

The resulting azo-disulfide dyestuff dyes cotton and regenerated cellulose a greenish yellow and has the following chemical formula:

Example III

This example is the same as Example I, except that one mole of meta-nitroaniline is substituted for the para-nitroaniline and one mole (98 gms.) of 3-methyl-5-pyrazolone is substituted for the acetoacet-ortho-anisidide.

The resulting azo-disulfide dyestuff dyes cotton and regenerated cellulose a bright yellow shade, and has the following formula:

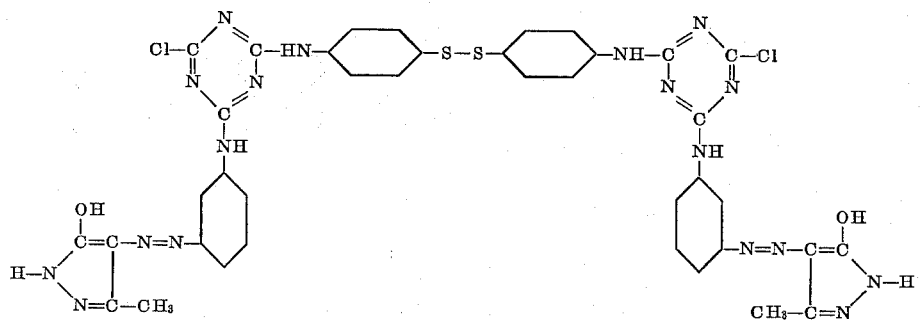

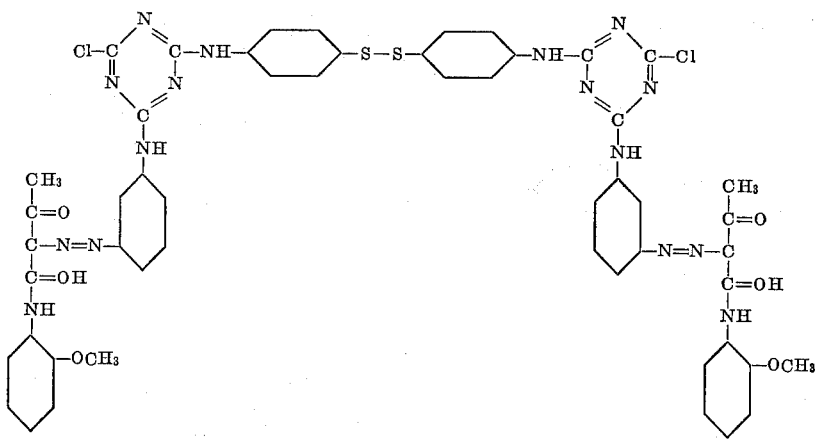

Example IV

This example is the same as Example I, except that one mole (174 gms.) of 1-phenyl-3-methyl-5-pyrazolone is substituted for the acetoacet-ortho-anisidide.

The resulting azo-disulfide dyestuff dyes cotton and regenerated cellulose a bright orange, and has the following chemical formula:

Example VI

This example is the same as Example I above except that one mole of 1-phenyl-3-methyl-5-pyrazolone is substituted for the acetoacet-ortho-anisidide and one-half mole (174 gms.) of 4:4'-diaminodinaphthyldisulfide is substituted for the 4:4'-diaminodiphenyldisulfide.

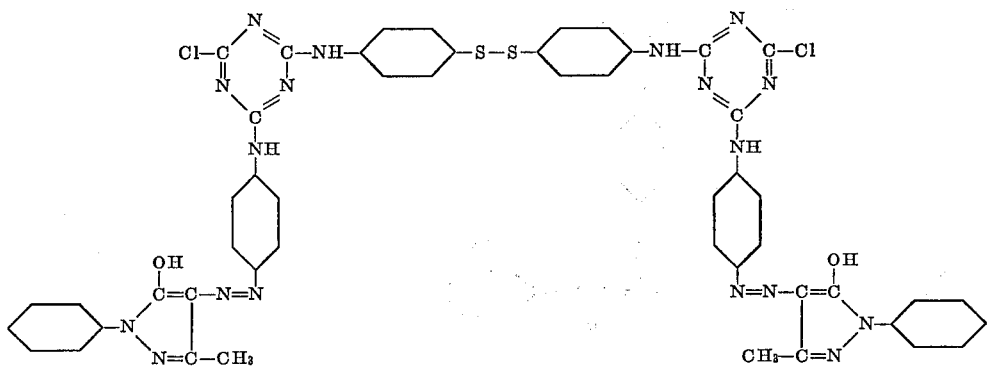

Example V

This example is the same as Example I above except that one mole (138 gms.) of meta-nitroaniline is substituted for the para-nitroaniline and one mole (174 gms.) of 1-phenyl-3-methyl-5-pyrazolone is substituted for the acetoacet-ortho-anisidide.

The resulting dyestuff dyes cotton and regenerated cellulosic fibers a bright yellow shade, and has the following chemical formula:

The resulting dyestuff dyes cotton and regenerated cellulose fibers a bright orange and has the following formula:

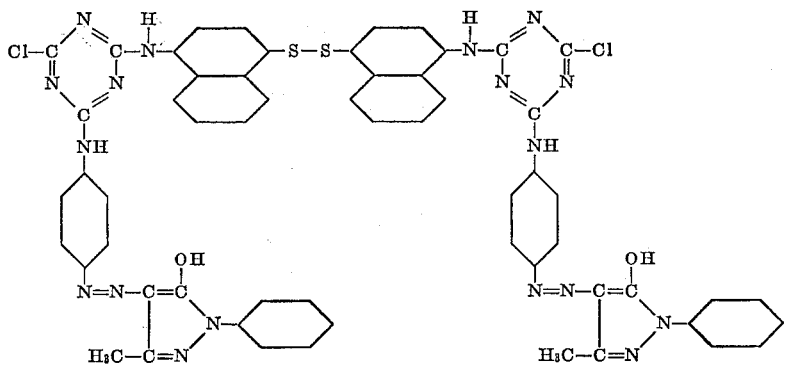

Example VII

This example is the same as Example I above except that one mole of 1-phenyl-3-methyl-5-pyrazolone is substituted for the acetoacet-ortho-anisidide and one-half mole (204 gms.) of 4:4'-diamino-3:3'-dimethoxynaphthyldisulfide is substituted for the 4:4'-diaminodiphenyldisulfide.

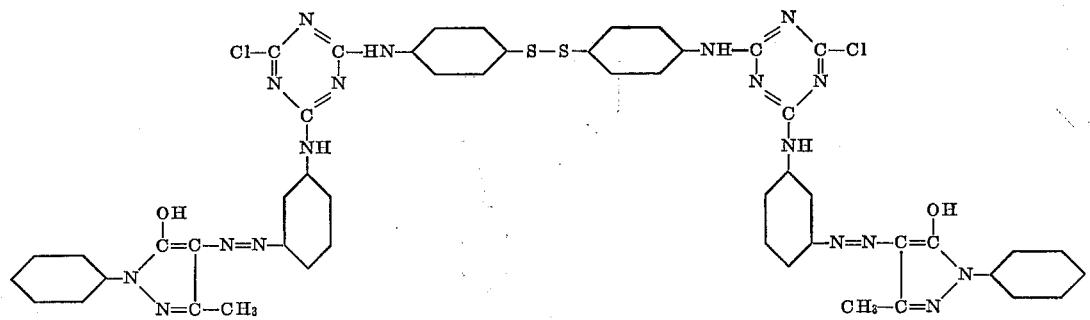

The resulting dyestuff dyes cotton and regenerated cellulose a bright orange and has the following formula:

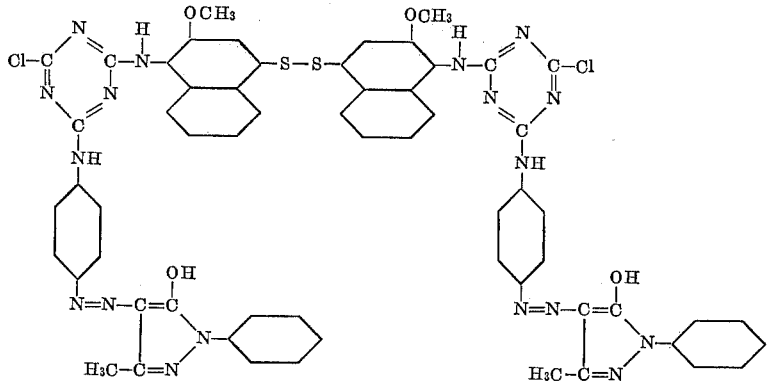

Example VIII

This example is the same as Example I except that one mole (161 gms.) of 2,4-dihydroxy-quinoline is substituted for the acetoacet-ortho-anisidide.

The resulting azo-disulfide dyestuff dyes cotton and regenerated cellulose fibers a reddish-orange and has the following formula:

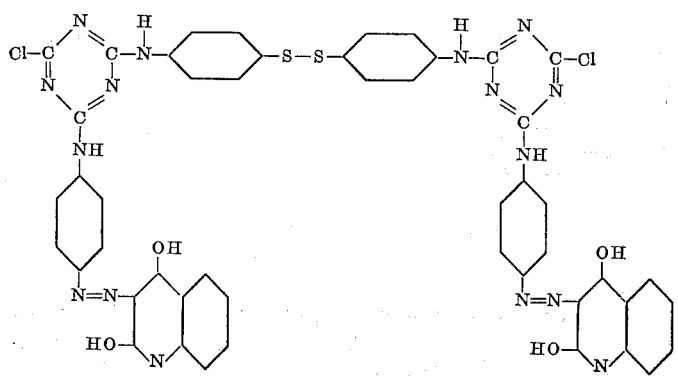

Example IX

This example is the same as Example I above, except that one mole (144 gms.) of beta-naphthol is substituted for the acetoacet-ortho-anisidide.

The resulting dyestuff may be used to dye cotton and regenerated cellulose fibers a reddish-brown and has the following formula:

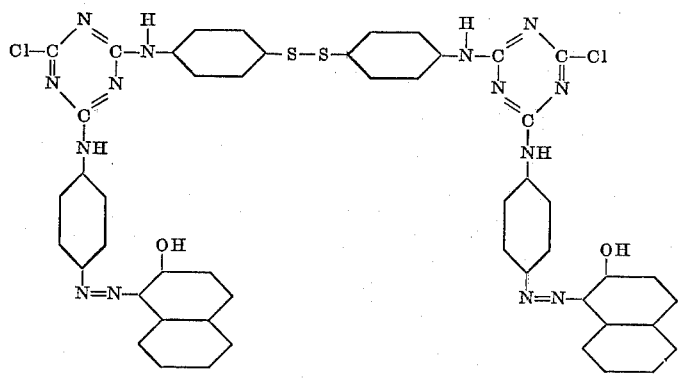

Example X

This example is the same as Example I above except that one mole (293 gms.) of Naphthol AS–OL (3-hydroxy-2-naphth-o-anisidide) is substituted for the aceto-acet-ortho-anisidide.

The resulting dyestuff may be used to dye cotton and cellulose fibers a reddish-violet and has the following formula:

phenyl-3-methyl-5-pyrazolone, in a manner analogous to that described in Example I.

One mole of the chromophore is condensed with one mole of 2,4,6-trichloro-1,3,5-triazine in a manner analogous to that described in Example I to produce a dihalogeno-triazine-chromophoric intermediate.

One mole of the dihalogeno-triazine-chromophoric intermediate is condensed with one-half mole of 4:4'-diaminodiphenyldisulfide, in a manner analagous to that

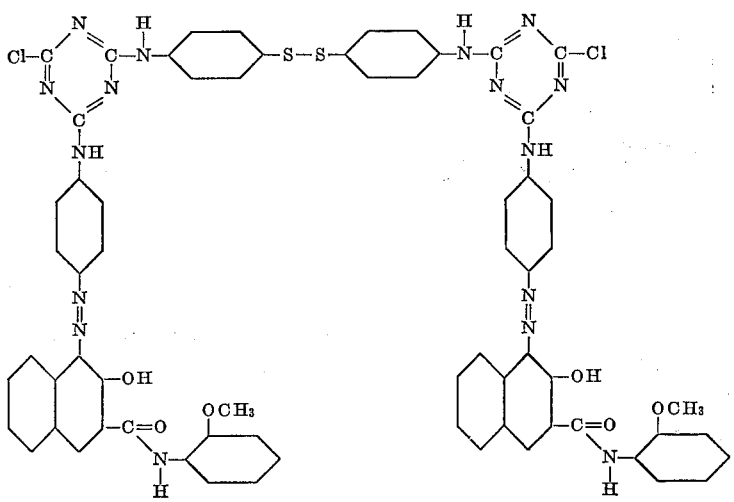

Example XI

This example is the same as Example I above, except that one-half mole (158.5 gms.) of 2,2'-dichloro-4:4'-diaminodiphenyldisulfide is substituted for the 4:4'-diaminodiphenyldisulfide.

The resulting dyestuff dyes cotton and regenerated cellulose fibers a bright greenish-yellow and has the following formula:

described in Example I, and the slightly acid acetone solution of the resulting product is preserved.

Two moles (186 gms.) of aniline are added to the slightly acid acetone solution described just above, allowing the temperature to rise to 45° C. Gradually, during a period of 30 minutes, 530 gms. of 20% aqueous solution of soda ash are added. The solution should be slightly acid (show neutral on congo paper) at this point

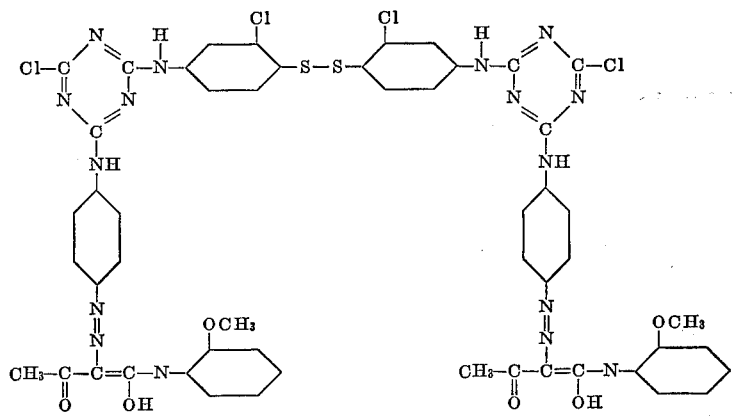

Example XII

The chromophore is prepared by diazotising one mole of para-nitroaniline and coupling it to one mole of 1- and the condensation reaction be completed. Warm the solution to 60° C. and recover the dyestuff as described in Example I.

The resulting dyestuff may be used to dye cotton and regenerated cellulose fibers reddish-orange, and has the following formula:

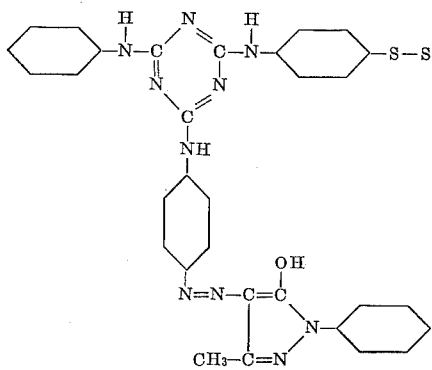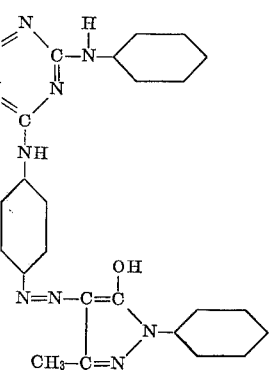

The azo-disulfide dyestuffs of the present invention may be used to dye and print cotton and regenerated cellulose textile fibers by the reduction-oxidation method.

Dyeings may be made with the azo-disulfide dyestuffs of the present invention as follows. Pad onto the fabric an aqueous dispersion of the azo-disulfide dye at 150° F., 2 oz. of dye per gallon of water, allowing 85% pickup based on fabric weight; dry the fabric; pad aqueous solution of sodium sulphide reducing agent onto the fabric, 10 oz. sodium sulphide per gallon of water at 150° F.; steam the fabric with neutral air-free steam for one minute at 212°–215° F.; wash the fabric with water at 140° F.; pad aqueous solution of oxidizing agent onto the fabric, 1 oz. glacial acid and 1 oz. sodium bichromate per gallon of water at 140° F.; rinse in water; scour; and dry.

Cotton or regenerated cellulose may be printed with the azo-disulfide dyestuffs of the present invention by applying to the fabric a printing paste consisting of 104 gms. starch-tragacanth gum, 4 gms. di(sodiocarboxymethyl) trithiocarbonate reducing agent, 4 gms. diethylene glycol, 4 gms. urea, 3 gms. NaOH, and 15 gms. of 20% aqueous dispersion of azo-disulfide dyestuff; drying the fabric; steaming the fabric for 2–10 minutes with neutral air-free steam at 212°–225° F. to reduce the dyestuff; oxidizing the dyestuff by immersing the fabric for 15 seconds in an acid-oxidizing bath containing 1.5 oz. of glacial acetic acid and 1 oz. of sodium bichromate per gallon of water at 140° F.; rinsing in water; scouring and drying the fabric.

It is believed that the chemistry of the dyeing and printing reaction is as follows. The azo-disulfide dyestuffs of the present invention contain a disulfide linkage (R—S—S—R), which should be considered the normal oxidized state of the dyestuff. Upon reduction, the dye molecule is broken between the sulfur atoms to form two molecules, R—S—Na+R—S—Na, in which reduced form it penetrates the fibers. The oxidizing agent then restores the azo-disulfide dyestuff to the R—S—S—R, or normal oxidized state, firmly fixed upon the fibers.

Therefore, it will be understood that dyes having the formula

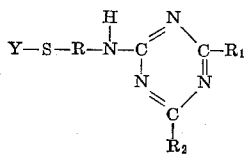

wherein R is an aryl or substituted aryl substituent, $R_1$ is a member selected from the group consisting of halogen, amine, and substituted amine, $R_2$ is a chromophoric group, and Y is a substituent, such as —CN or $NaO_3S$—, which upon being hydrolyzed causes cleavage, yielding a free mercapto group attached to the R substituent, are the chemical equivalent of those claimed herein, and are intended to be covered by the appended claims, inasmuch as these equivalent dyes form the azo-disulfide dyestuffs of the present invention (the R—S—S—R form) upon being oxidized on the fibers.

What is claimed is:

1. A compound of the formula

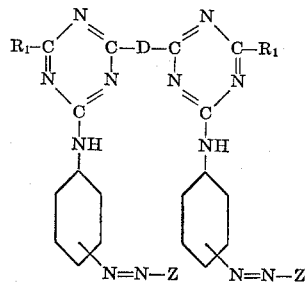

wherein D is the radical of a member selected from the group consisting of diaminodiphenyldisulfides and diaminodinaphtyldisulfides, D being linked to the triazines via its amino groups; $R_1$ is a member selected from the group consisting of chlorine and phenylamino; Z is the radical of a member selected from the group consisting of acetoacet-ortho-anisidide, 3-methyl-5-pyrazolone, 1-phenyl-3-methyl-5-pyrazolone, 2,4 - dihydroxyquinoline, β-naphthol, and 3-hydroxy-2-naphth-ortho-anisidide; and in which the azo groups are positioned meta or para with respect to the amino groups attached to the phenyl rings.

2. A compound of the formula

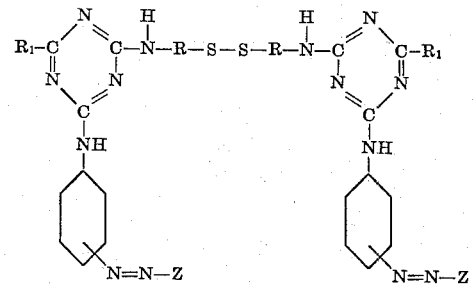

wherein R is a substituent selected from the group consisting of phenyl, naphthyl, chlorine substituted phenyl, and methoxy substituted naphthyl; $R_1$ is a substituent selected from the group consisting of chlorine and phenylamino; Z is the radical of a member selected from the group consisting of acetoacet-ortho-anisidide, 3-methyl-5 - pyrazolone, 1 - phenyl-3-methyl-5-pyrazolone, 2,4-dihydroxyquinoline, β-naphthol, and 3-hydroxy-2-naphth-ortho-anisidide; and in which the azo groups are positioned meta or para with respect to the amino groups attached to the phenyl rings.

3. A compound of the formula
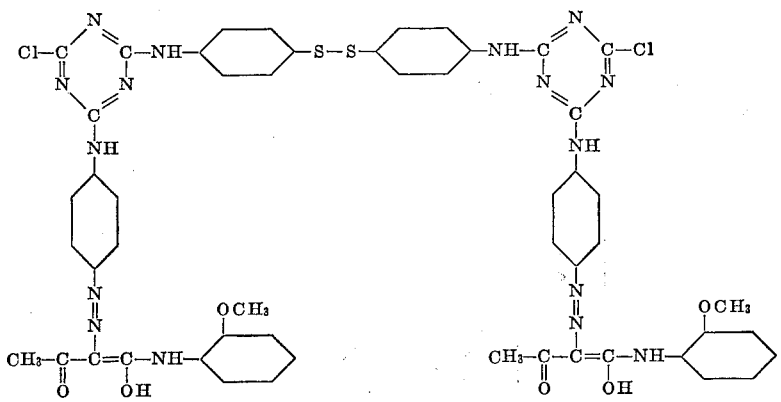
4. A compound of the formula
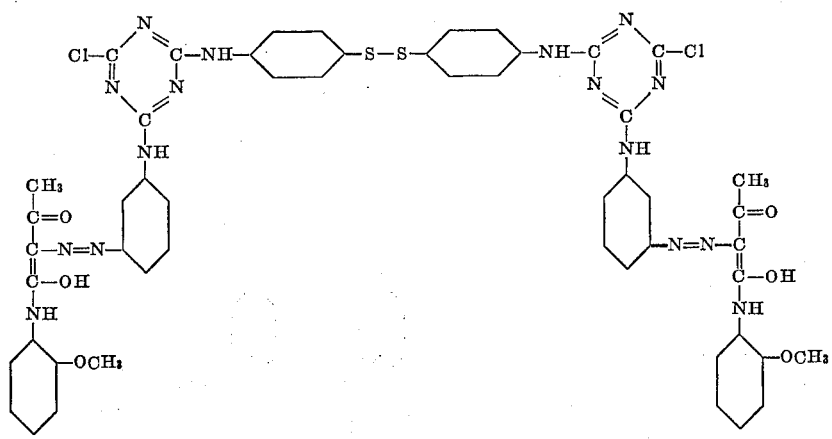
5. A compound of the formula
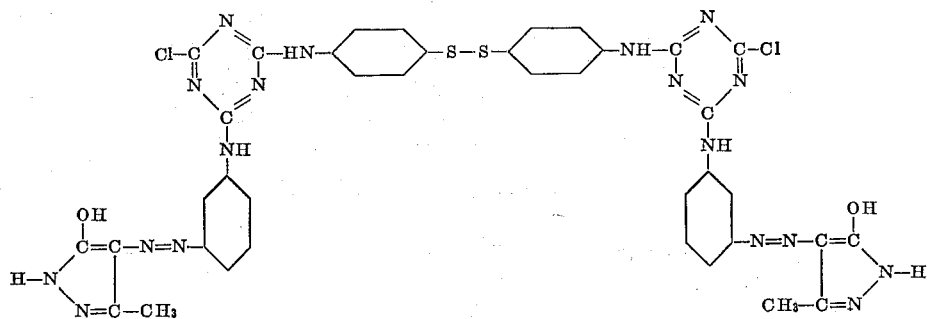
6. A compound of the formula
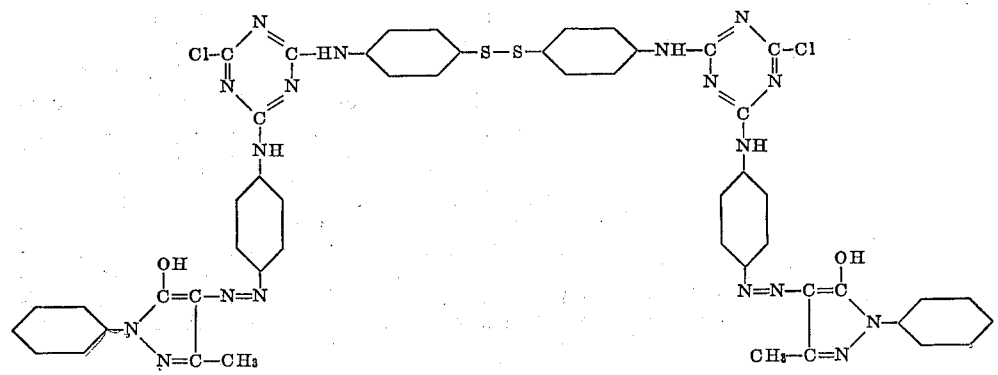

7. A compound of the formula
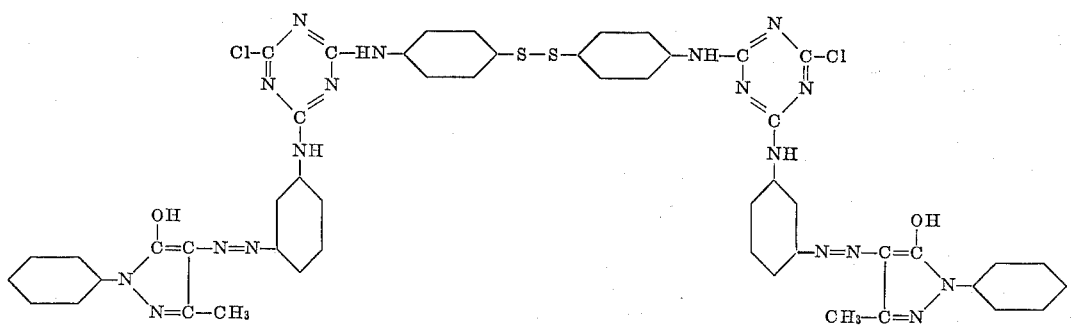
8. A compound of the formula
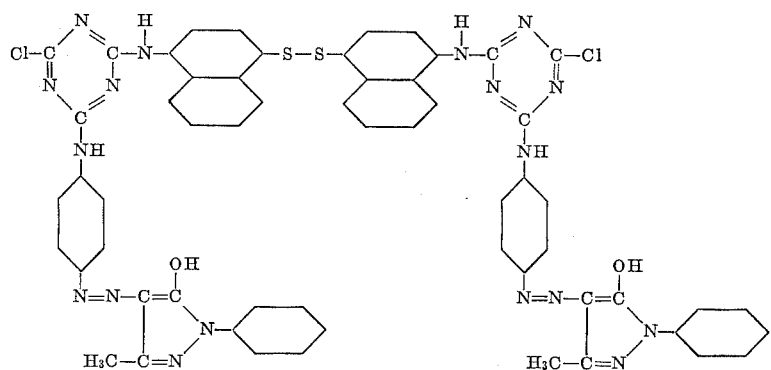
9. A compound of the formula
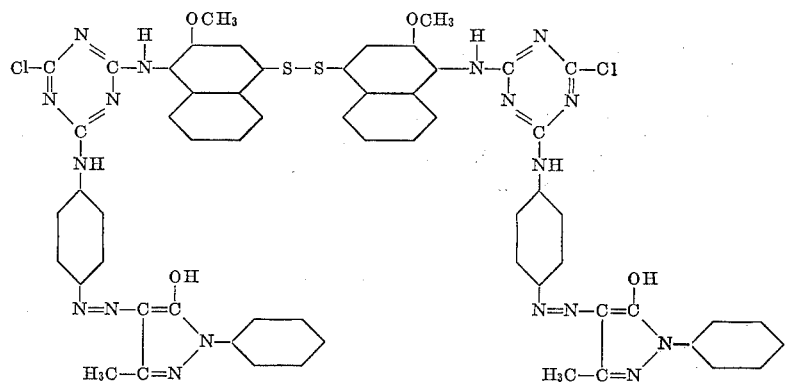
10. A compound of the formula
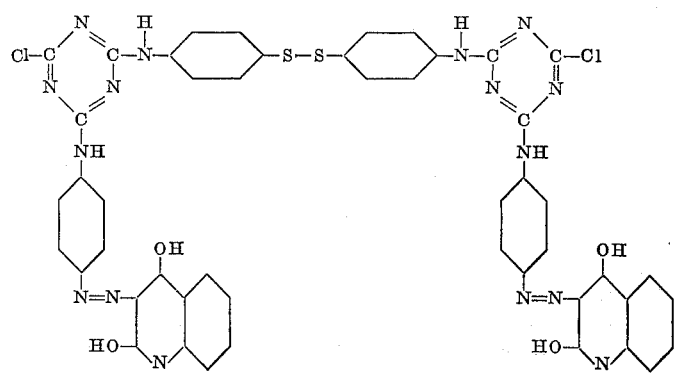

11. A compound of the formula
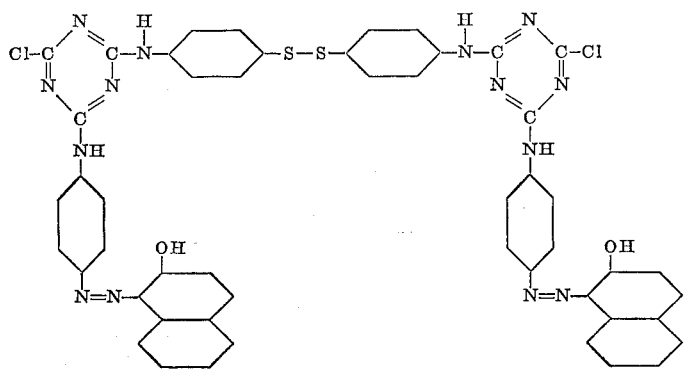
12. A compound of the formula
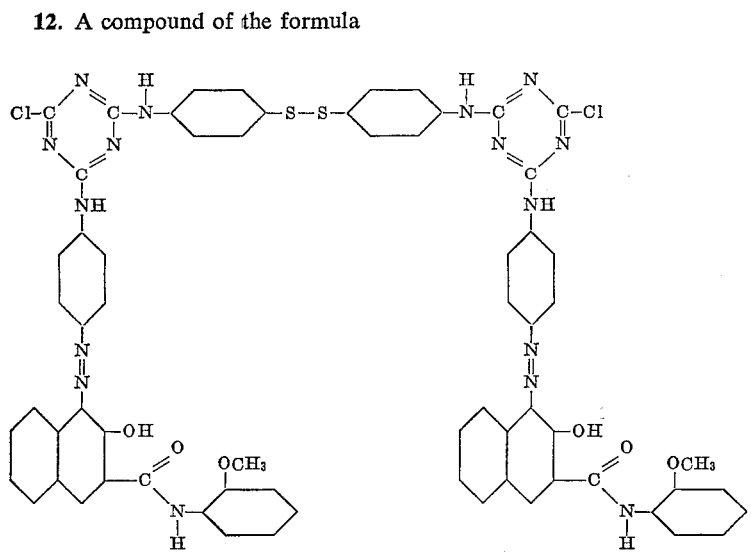
13. A compound of the formula
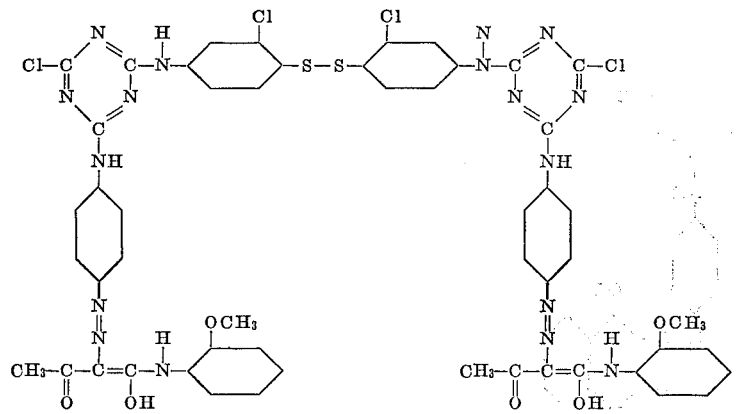

14. A compound of the formula
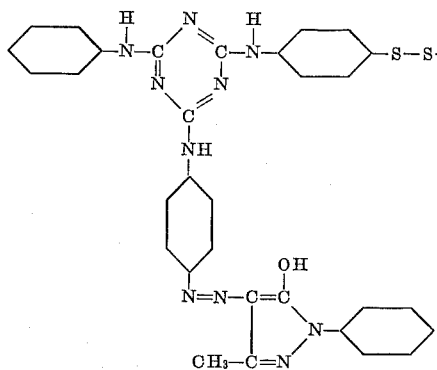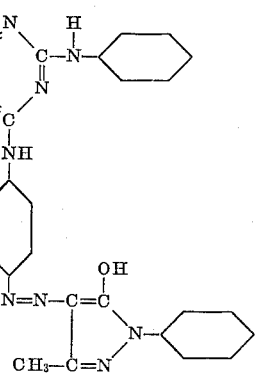
References Cited by the Examiner
UNITED STATES PATENTS
2,399,066   4/1946   Schmid et al. _____ 260—153
CHARLES B. PARKER, *Primary Examiner.*
R. J. FINNEGAN, D. M. PAPUGA, *Assistant Examiners.*